(12) United States Patent
Billerbeck

(10) Patent No.: US 8,890,812 B2
(45) Date of Patent: Nov. 18, 2014

(54) GRAPHICAL USER INTERFACE ADJUSTING TO A CHANGE OF USER'S DISPOSITION

(71) Applicant: JDS Uniphase Corporation, Milpitas, CA (US)

(72) Inventor: Bryed Billerbeck, Cupertino, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 15 days.

(21) Appl. No.: 13/660,468

(22) Filed: Oct. 25, 2012

(65) Prior Publication Data
US 2014/0118255 A1   May 1, 2014

(51) Int. Cl.
*G06F 3/033* (2013.01)
*G09G 5/08* (2006.01)

(52) U.S. Cl.
USPC .......................................... 345/158; 345/156

(58) Field of Classification Search
CPC ............ G06F 3/01; G06F 3/033; G09G 5/008
USPC .............................. 345/156–158, 173; 348/77
See application file for complete search history.

(56) References Cited

U.S. PATENT DOCUMENTS

| | | | |
|---|---|---|---|
| 7,340,077 B2 | 3/2008 | Gokturk et al. | 382/103 |
| 7,348,963 B2 | 3/2008 | Bell | 345/156 |
| 7,593,552 B2 * | 9/2009 | Higaki et al. | 382/118 |
| 8,614,674 B2 * | 12/2013 | Binder | 345/158 |
| 8,630,493 B2 * | 1/2014 | Gokturk et al. | 382/203 |
| 8,649,554 B2 * | 2/2014 | Markovic et al. | 382/103 |
| 8,649,572 B2 * | 2/2014 | Gokturk et al. | 382/118 |
| 8,693,732 B2 * | 4/2014 | Eilat et al. | 382/103 |
| 2003/0113018 A1 | 6/2003 | Nefian et al. | 382/181 |
| 2006/0044399 A1 * | 3/2006 | Fredlund et al. | 348/207.99 |
| 2009/0009593 A1 | 1/2009 | Cameron et al. | 348/51 |
| 2010/0309204 A1 | 12/2010 | Smith et al. | 345/419 |
| 2011/0164032 A1 | 7/2011 | Shadmi | 345/419 |
| 2011/0271235 A1 | 11/2011 | Doyen et al. | 715/863 |

* cited by examiner

*Primary Examiner* — Ricardo L Osorio
(74) *Attorney, Agent, or Firm* — JDS Uniphase Corporation

(57) ABSTRACT

A user interface apparatus and a method for adjusting the apparatus are disclosed. A position and/or a viewing angle of the user is tracked, and graphical interface objects are adjusted to keep them visible at different user's distances and viewing angles. For example, as the user steps away from the display, the objects on the display can be proportionally enlarged to make them appear of the same size to the user. The sensitivity of a gesture recognition system to the user's movements and gestures can be also adjusted to facilitate manipulation of the objects by the user at different distances from the display of the graphical user interface.

19 Claims, 4 Drawing Sheets

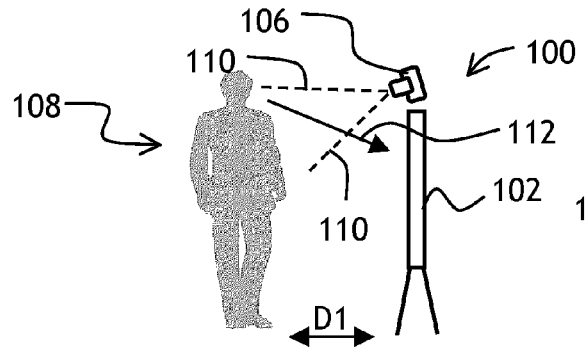 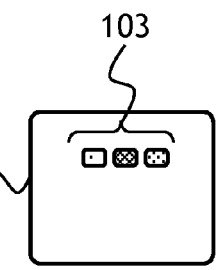
FIG. 1A  FIG. 2A
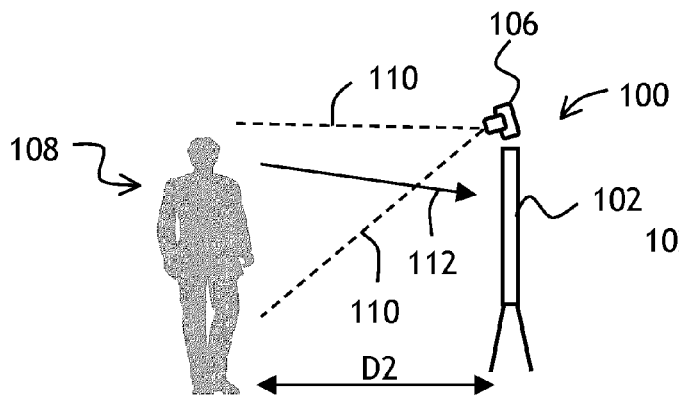 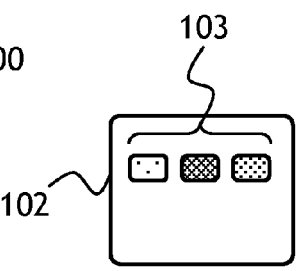
FIG. 1B  FIG. 2B
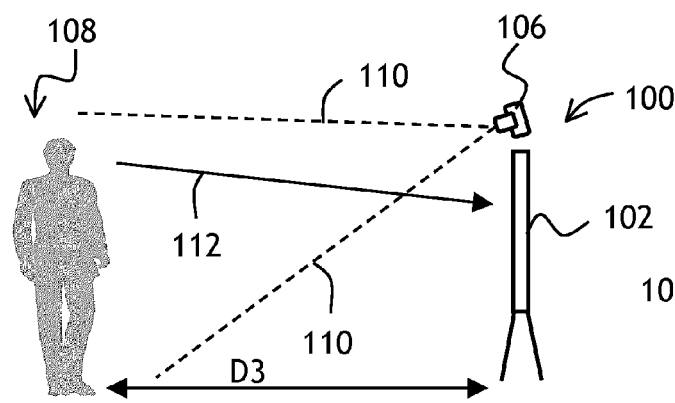 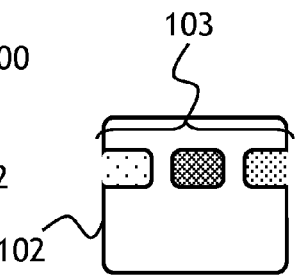
FIG. 1C  FIG. 2C

GRAPHICAL USER INTERFACE ADJUSTING TO A CHANGE OF USER'S DISPOSITION

TECHNICAL FIELD

The present invention relates to human-machine interaction, and in particular to user interfaces sensitive to user's geometrical disposition relative to a display of a graphical user interface.

BACKGROUND OF THE INVENTION

An interface between a human and a machine usually includes an input device for inputting information into the machine, and an output device for outputting information in a form suitable for a human user. For example, a typical computer interface includes a computer mouse and keyboard for inputting data into a computer, and a graphical display for outputting information such as text being typed, graphics, location of the text insertion point (cursor), etc.

Recently, interfaces where the information is input by gestures of a user, unaided by dedicated input devices such as a keyboard or a mouse, have been finding increased interest. In such interfaces termed "gesture recognition" ("GR") systems, a depth sensitive camera is used to determine user's gestures. The posture of the user, or at least a relative orientation and position of the head, arms, legs, and/or hands of the user, is displayed on a monitor, to give the user a live graphical feedback of what the computer considers the current user posture is. To a certain extent, the user's hands, arms, or fingers act similarly to a computer mouse of a traditional graphical user interface (GUI). In a traditional GUI, the position of a computer mouse is also tracked on the computer screen, to let the user know where the point of selection is at the moment. The gesture-driven computer input, however, holds a promise of much greater versatility. The number of gestures by user's hands is considerably greater than the number of mouse buttons, and the number of fingers that can be simultaneously used on a typical multipoint computer trackpad. Furthermore, the gesture-driven input feels more natural to users and is much quicker to learn, especially in GR gaming applications, which quickly attain popularity among children and grown-ups alike.

Bell in U.S. Pat. No. 7,348,963 discloses an interactive video display system allowing a user to use their hands to selectively manipulate virtual objects and cause digital visual effects. A projector can be used to project light on a physical object movable by the user and tracked by the computer of the video display system. The system of Bell is usable, for example, in an interactive advertising display, or in interactive projection displays found in halls of some movie theaters.

Shadmi in US Patent Application Publication 2011/0164032 discloses a three-dimensional (3D) user interface having a sensor for determining the position of user's hands in 3D space, and a 3D display device. A computer generates a 3D scenery and outputs it to the 3D display device, while tracking position of the user's hands. The computer determines a proximity of the user's hand to a virtual 3D element, allowing the user to manipulate and rearrange virtual 3D elements by performing hand gestures. The interface of Shadmi is usable, for example, in a mechanical computer-aided design (CAD) system operating with three-dimensional virtual objects.

One drawback of gesture-based user input systems described above is related to the fact that the user's position and angle with respect to the display monitor can vary greatly. The user can come close to the monitor, or step away to perform a variety of gestures and movements. Yet, gesture-based user input systems depend upon graphical feedback to the user as to what the user's posture or orientation is, and what actions the user can take at the moment. When the user steps too far away from the display monitor, the graphical features may become difficult for the user to see, which limits effectiveness of a gesture-based interface. For example, the user can step as close as 0.5 m to the display monitor, or move as far away as 5 m, and even further. This problem does not normally occur with traditional GUI systems, where the keyboard and the mouse are placed near the computer monitor in front of a user sitting in a chair.

User interfaces, in which 3D viewing conditions are adjusted based on the viewer's gesture input, are known. For example, Doyen et al. in US Patent Application Publication 2011/0271235 disclose a method for adjusting depth of field in a 3D display by displaying 3D pictures or menus to a user, and adjusting the depth of field based on reactive gestures by the user. However, most prior art user interfaces, including that of Doyen et al., suffer from a drawback of viewing conditions generally worsening as the user steps away from the display device of the GUI. Accordingly, it is a goal of the invention to provide a user-machine interface, in which this undesired effect is reduced, or even eliminated within an interaction area of the interface.

SUMMARY OF THE INVENTION

The present invention provides a method for increasing a dynamic range of a user interface including a spatial sensor and a display. A position and/or a viewing angle of the user is tracked by the spatial sensor, and the displayed graphical interface objects are dynamically adjusted or modified to keep them visible independently of the user's position and/or viewing angle. In one embodiment, a displayed object is proportionally enlarged as the user steps away from the display, to make the object appear of a same size to the user, regardless of a distance to the display. The sensitivity of the GR system to the user's movements and gestures can be adjusted accordingly, to facilitate manipulation of the objects by the user at different distances from the display.

In accordance with the invention, there is provided a method of operating a user interface comprising a display for displaying a plurality of graphical objects, and a spatial detector for detecting a distance and/or a viewing angle of a user relative to the display, the method comprising:

(a) using the spatial detector to detect a change of the distance and/or the viewing angle of the user relative to the display;

(b) automatically adjusting at least one of position, orientation, size, shape, color, brightness, or contrast of at least one of the plurality of graphical objects displayed by the display, in dependence upon the change detected in step (a), so as to lessen a change of visible shape or size, and/or a change of visibility of the at least one graphical object to the user, resulting from the change detected in step (a); and (c) repeating steps (a) and (b) to continuously adjust the at least one of position, orientation, size, shape, color, brightness, or contrast of the at least one graphical object, so as to lessen changes of the visible shape or size, and/or changes of the visibility of the at least one graphical object resulting from changes of the distance and/or the viewing angle of the user relative to the display.

In one embodiment, the user interface is capable of recognizing gestures of the user, and in step (a), the change of the distance, the viewing angle, or both, of the user relative to the display results in a change of a sensitivity of the gesture recognition. This embodiment of the method can further include a step of (d) adjusting the gesture recognition sensitivity in dependence on the change of the distance and/or the viewing angle of the user, detected in step (a), so as to lessen the change of the gesture recognition sensitivity due to the change of the distance and/or viewing angle of the user.

Step (d) is performed after step (a), and step (c) includes repeating step (d) in addition to steps (a) and (b).

In accordance with another aspect of the invention, there is further provided a method for dynamically adjusting a graphical user interface for interaction with a user, the method comprising:

(i) determining a distance and/or a viewing angle of the user relative to the graphical user interface;

(ii) detecting a change of the distance and/or the viewing angle determined in step (i); and (iii) dynamically adjusting at least one of position, orientation, size, shape, color, brightness, or contrast of at least one of a plurality of graphical objects displayed by the graphical user interface, so as to lessen a change of shape and/or size of the at least one graphical object visible to the user, resulting from the change of the distance and/or the viewing angle thereof detected in step (ii).

In accordance with yet another aspect of the invention, there is further provided a user interface apparatus, comprising:

a display for displaying a plurality of graphical objects to a user;

a spatial detector for determining a distance and/or a viewing angle of the user relative to the display; and a controller operationally coupled to the display and the spatial detector.

The controller of the user interface apparatus can include a user locator module or modules, which use the depth data and skeletal or anthropomorphic models created from the depth data by software running on a camera processor, or on a host device processor or some combination of the camera, host or network processors, or by algorithms implemented in hardware, for detecting a change of the distance and/or the viewing angle of the user relative to the display. A graphical user interface adjustment algorithms implemented in software or hardware can automatically adjust at least one of position, orientation, size, shape, color, brightness, or contrast of at least one of the plurality of graphical objects displayed by the display. The adjustment is done in dependence upon the change of the distance and/or the viewing angle detected by the user locator module, so as to lessen a change of visible shape or size, and/or a change of visibility of the at least one graphical object to the user, resulting from the detected change of the distance and/or the viewing angle of the user.

BRIEF DESCRIPTION OF THE DRAWINGS

Exemplary embodiments will now be described in conjunction with the drawings, in which:

FIGS. 1A to 1C are schematic side views of a user standing at various distances from a user interface apparatus of the invention, the distances increasing in going from FIG. 1A to FIG. 1C;

FIGS. 2A to 2C are frontal views of a display of the user interface apparatus of FIGS. 1A to 1C, showing a group of buttons, the views of FIGS. 2A to 2C corresponding to the positions of the user shown in FIGS. 1A to 1C, respectively;

DETAILED DESCRIPTION OF THE INVENTION

Figures 3B, 4B:
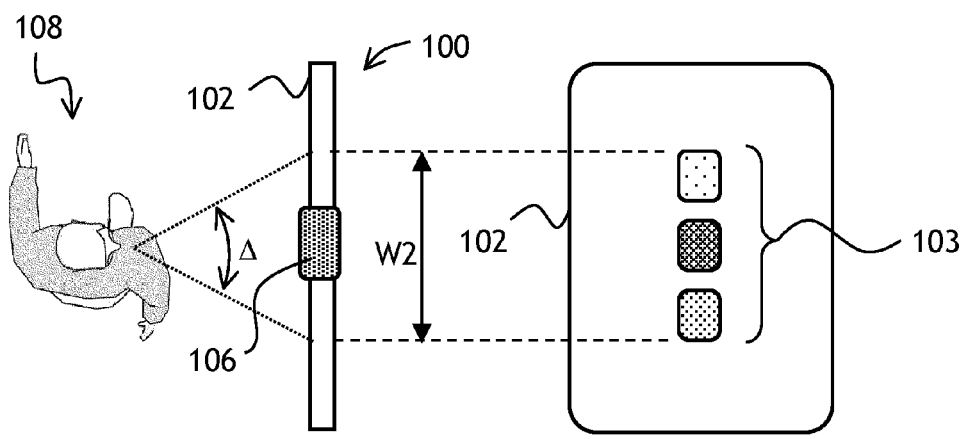
FIGS. 3A and 3B are schematic top views of the user observing the display at a non-zero viewing angle (FIG. 3A), and at a zero viewing angle (FIG. 3B)
FIGS. 4A and 4B are frontal views of the display, showing a group of buttons, the views of FIGS. 4A and 4B corresponding to the viewing angles shown in FIGS. 3A and 3B, respectively.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Referring to FIGS. 1A to 1C, a user interface 100 of the invention includes a display 102 displaying a plurality of graphical objects, in this case soft buttons 103, and a spatial detector 106 for detecting a distance, a viewing angle, or both, of a user 108 relative to the display 102. In the embodiment shown, the spatial detector 106 includes a time-of-flight based depth detecting camera or a display-embedded depth detecting camera module, which illuminates the user 108 with pulsed or modulated infrared beams 110, and obtains an image of the user 108 in infrared light using a time-gated or phase-sensitive detector array, not shown. Other methods of creating depth maps include but are not limited to stereoscopic cameras, structured light cameras, sonars, etc. The obtained image includes X, Y, and Z (depth) coordinates for each pixel, in addition to brightness of each pixel. This allows a depth map to be constructed, from which the position and the angle of view of the user 108 relative to the display 102 can be determined. The user 108 looks at the display 102, as indicated with arrows 112. The distance between the user 108 and the display 102 increases from D1 to D2 to D3 in going from FIG. 1A to FIG. 1B to FIG. 1C, respectively. For example, the distance can increase from 1 m to 2.5 m to 4 m.

Turning to FIGS. 2A to 2C, the display 102 shows the three soft buttons 103. This is what the user 108 of FIGS. 1A to 1C sees on the display 102 as the distance D between the user 108 and the display 102 increases from D1 to D2 to D3. The user interface 100 is configured to increase the linear size of the soft buttons 103 as the distance between the user 108 and the display 102 increases. Preferably, the linear size of the soft buttons 103 increases proportionally to a relative change of the distance D between the user 108 and the display 102, so that the user 108 sees that the angular size of the soft buttons 103 is substantially unaffected by the change of the distance between the user 108 and the display 102. As a result, the soft buttons 103 remain equally visible to the user 108 at any distance between 1 m and 4 m. The limit distances of 1 m and 4 m are, of course, only for an example. The actual limit distances depend on the type of the user interface 100, and may vary.

Figures 3A, 4A:
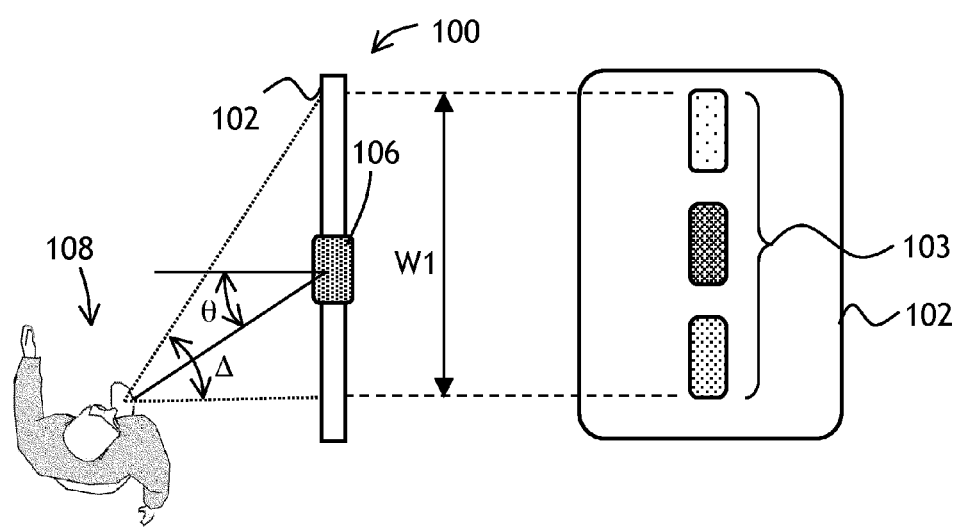

Referring to FIGS. 3A, 3B and 4A, 4B, the display 102 is shown in top view in FIGS. 3A, 3B. Accordingly, the soft buttons 103 are disposed vertically in FIGS. 4A, 4B. Referring specifically to FIGS. 3A and 4A, the linear and angular size of the group of three soft buttons (triad of buttons) 103 is W1 and Δ, respectively, and the observation angle (viewing angle) is θ. As the user 108 walks past the display 102, the viewing angle θ is decreasing. Referring specifically to FIGS. 3B and 4B, the viewing angle θ is zero. The user interface 100 is configured to decrease the linear size of the buttons triad 103 from W1 to W2, such that the angular size Δ of the buttons triad 103 stays substantially constant. As a result, the soft buttons 103 remain equally visible to the user 108 at any viewing angle θ within the viewing angle limit of the user interface 100. If the display is a 3D display, these same soft buttons 103 or other control objects would appear to move about the projected image to optimize their view and use by the user at non-zero viewing angles θ.

In operation, the spatial detector 106 detects a change of the distance D, the viewing angle θ, or both, of the user 108 relative to the display 102. Then, at least one of size, orientation, or shape of a graphical object, such as the buttons triad 103 displayed by the display 102, is adjusted in dependence upon the change of the distance D or the viewing angle θ, so as to lessen a change of visible shape or size of the graphical object 103 to the user 108, resulting from the change of the distance D from D1 to D2 to D3. The steps of detecting the change of the distance D and/or the viewing angle θ are repeated for continuous, automated tracking of the position and orientation of the user 108. The adjustment is performed repetitively and dynamically. In a preferred embodiment, the adjustment of the position, orientation, size, shape, color, brightness, or contrast of the graphical object is performed in real time as the user 108 moves around the user interface 100, for example with a repetition frequency faster than 100 ms or 3 frame times, so as not to be noticeable by the user 108. A time interval of 100 ms, or 3 frames, is about the threshold of human time detection. Of course, the user interface 100 could be constructed to take longer than 100 ms to react, but the user 108 would then notice the delays between his movement or control actions and host command or display modification response, which is undesirable.

The "graphical object" can include a single soft button of the triad 103, the entire cluster (triad) of the soft buttons 103, or even each graphical object comprising the graphical interface displayed by the display 102. Position of the graphical object(s) 103 can also be adjusted for a better visibility by the user 108. The position can be adjusted horizontally, vertically, diagonally, etc. Furthermore, in one embodiment, color saturation, brightness, and/or contrast of the graphical object(s) 103 are adjusted, preferably increased proportionally with the distance D, to compensate for reduction of visibility of the graphical object(s) 103 by the user 108, resulting from the change of the viewing distance D and/or the viewing angle θ. The general goal of the adjustments is to lessen a change of visible shape and/or size, and, generally, a change of overall visibility of the graphical object(s) 103 to the user 108.

In a preferred embodiment, the user interface 100 is capable of gesture recognition. When the user 108 walks past the spatial detector 106 as shown in FIGS. 3A and 3B, or when the user 108 moves or shifts towards or away from the spatial detector 106 as shown in FIGS. 1A to 1C, a sensitivity of the gesture recognition generally changes. According to the invention, in a gesture recognition embodiment, the gesture recognition sensitivity is automatically adjusted in dependence on the change of the distance D and/or the viewing angle θ of the user 108, so as to lessen the change of the gesture recognition sensitivity due to the change of the distance D and/or the viewing angle θ of the user 108. The adjustment of both the graphical interface of the display 102 and the sensitivity of gesture recognition is performed repeatedly, for example with a repetition frequency faster than 100 ms or 3 frame times, so as not to be noticeable by the user 108, as explained above.

In one embodiment of the user interface 100, the adjustment of the at least one of position, size, shape, color saturation, brightness, or contrast of the graphical object(s) 103; and/or the adjustment of the gesture recognition sensitivity is substantially proportional to the change of the distance D and/or the viewing angle θ of the user 108. The shape and size of the graphical object(s) 103 can be adjusted to keep the angular size Δ substantially constant. This ensures that the object(s) 103 are always visible to the user 108, as long as the user 108 remains within a range of interaction between the user 108 and the user interface 100. This range is usually pre-defined by capabilities of the spatial sensor 106.

The adjustment of the position, shape, size, color, brightness, contrast, etc. of the graphical object(s) 103 and/or the gesture recognition sensitivity can be performed reactively or predictively. When the adjustments are performed reactively, the spatial detector 106 first detects a change of the distance D and/or the viewing angle θ, and then the adjustments are performed based on the detected change. When the adjustments are performed predictively, past changes of the distance D and/or the viewing angle θ are kept in a database, which is consulted to determine repetitive patterns of movements of the user 108. When a repetitive pattern is detected, predictive adjustments become possible. The reactive and/or predictive adjustments can be controlled by user presets stored in the user interface 100. More details about specifics of construction of the user interface 100 will be provided further below.

Figure 5A:
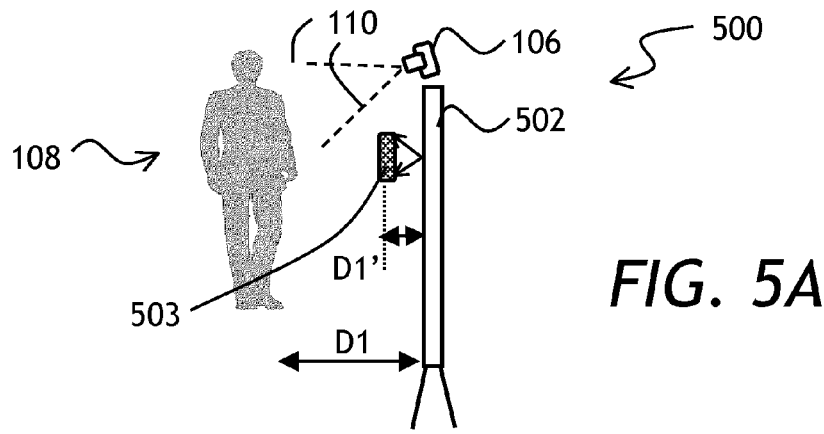
FIGS. 5A to 5C are schematic side views of the user standing at various distances from a three-dimensional display projecting a pushbutton towards the user, the distances increasing in going from FIG. 5A to FIG. 5C.
Figure 5B:
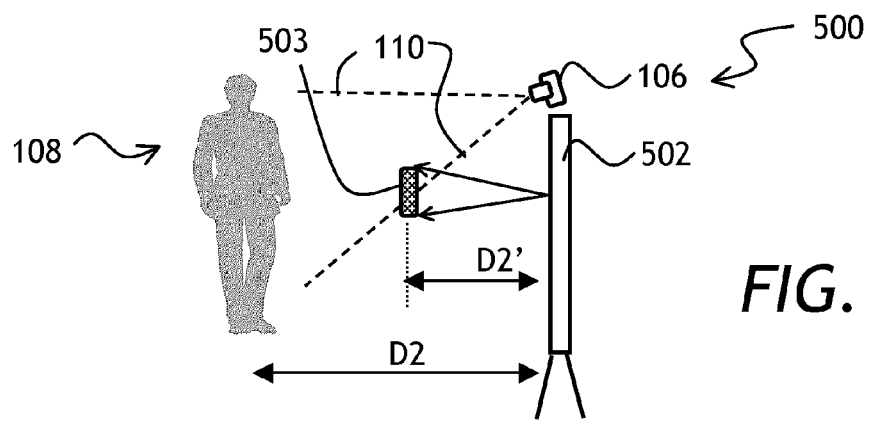
Figure 5C:
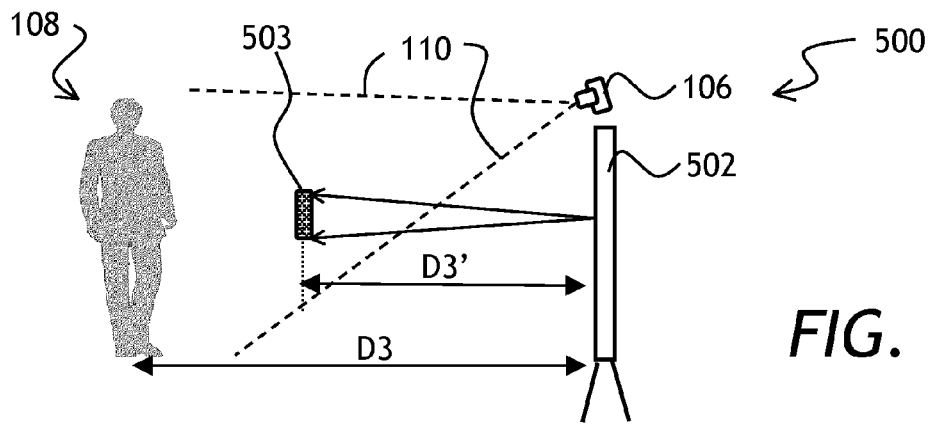

Turning now to FIGS. 5A to 5C, a user interface 500 is similar to the user interface 100 of FIGS. 1A-1C, 3A, and 3B. One difference is that the user interface 500 includes a three-dimensional display 502 capable of projecting a graphical object 503, e.g. a soft button, to appear as floating in the air in front of the user 108. The position of the graphical object 503 is characterized by two lateral coordinates and a depth coordinate D'. In accordance with one embodiment of the invention, the depth coordinate D' of the at least one graphical object is adjusted so as to lessen a perceived distance variation between the user 108 and the graphical object 503, as the user 108 moves within the range of interaction with the user interface 500. In FIGS. 5A, 5B, and 5C, the user 108 is disposed at distances D1, D2, and D3, respectively. The user interface 500 can be configured to project the graphical object (soft button) 503 at distances D1', D2', and D3', respectively, so that D1-D1'=D2-D2'=D3-D3', respectively. In other words, the user interface 500 is configured to keep a same distance between the user 108 and the soft button 503, so that the soft button 503 is disposed at a same distance to the user 108, regardless of the distance D between the user and the three dimensional display 502, within the interaction range between the user 108 and the user interface 500.

In one embodiment, the user interface 500 is configured to cause the graphical object 503 to follow a body of the user 108 as the user 108 moves, for example walks, past the display 503. This is achieved by adjusting the lateral coordinate(s) of the graphical object 503 to match, e.g. with a predetermined offset, those of the user 108. By way of a non-limiting example, the feature of "following the user" can be used in advertisement applications, allowing, for instance, the product being advertised to literally follow the user, as the user walks past the advertisement display. This feature can also be beneficial in data manipulation applications, allowing the user 108 to manipulate data from any position within the range of interaction with the user interface 500. In this and other embodiments of this invention, multiple users could be tracked simultaneously, and the user interface could be multiplexed, so that each user would see the graphical object(s) at his/her individual preferred or best viewing orientation and/or position. Each user could be followed by displayed graphical objects. To achieve this, the position of each graphical object can be adjusted to follow a body of a corresponding user, so that each user would have at least one graphical object following him/her. This might be particularly advantageous in interactive advertisement applications.

Figure 6:
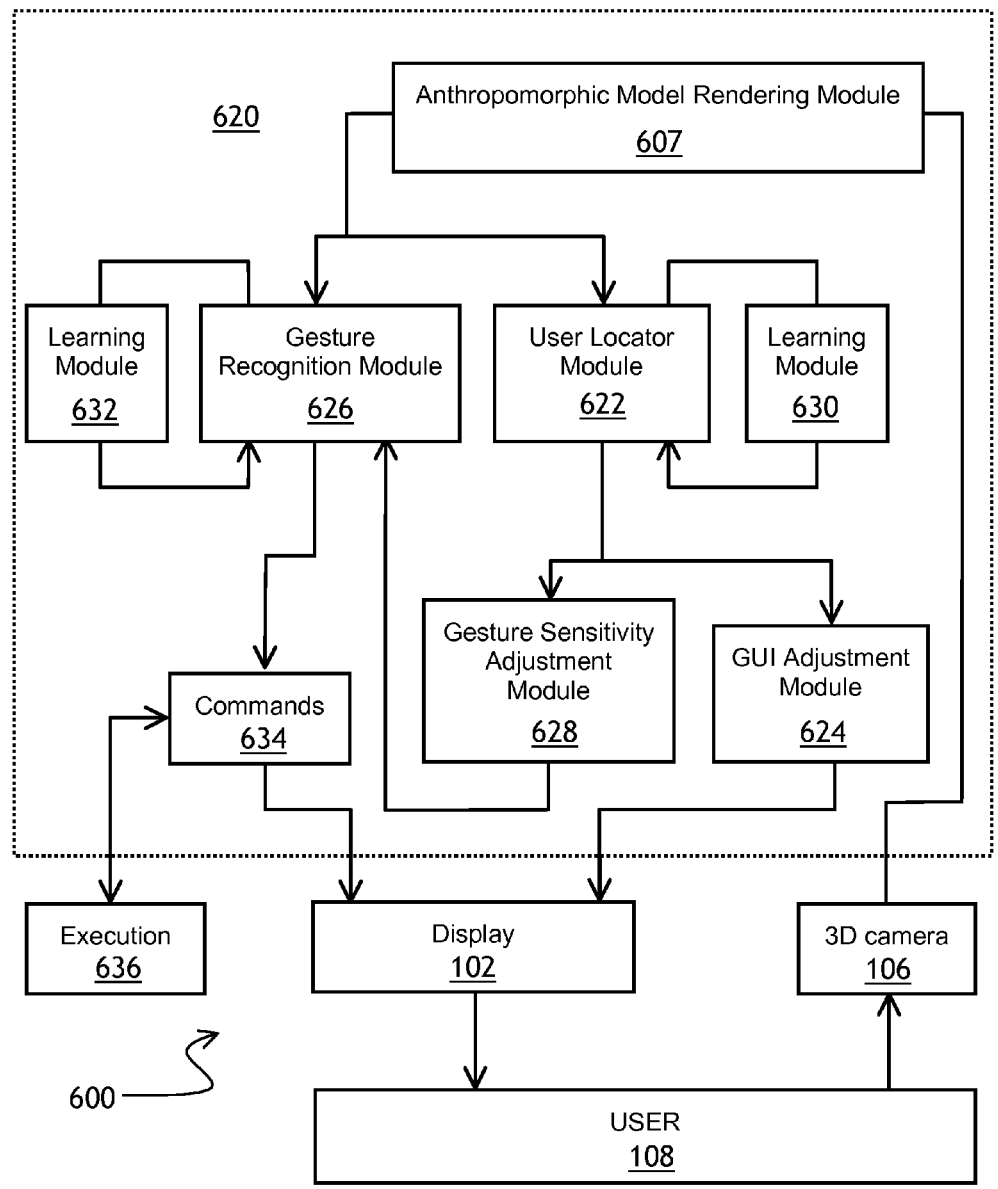
FIG. 6 is a block diagram of a user interface apparatus of the invention.

Referring now to FIG. 6, a user interface apparatus 600 is a variant of the user interface 100 of FIGS. 1A to 1C, 3A, and 3B, or the user interface 500 of FIGS. 5A to 5C. The user interface 600 includes the display 102 for displaying a plurality of graphical objects to the user 108, the spatial detector (3D camera) 106 for determining the distance D and/or the viewing angle θ of the user 108 relative to the display 102, and a controller 620 operationally coupled to the display 102 and the spatial detector 106, for performing various functions and general control of the user interface 600. The controller 620 includes a user locator module 622 coupled to the spatial detector 106 through an anthropomorphic model rendering module 607 for creating a parametric model of the user's body, for example head, arms, hands, and/or fingers of the user 108, based on the input from the spatial detector 106. The function of the user locator module 622 is to detect a change of the distance D and/or the viewing angle θ of the user 108 relative to the display 102. The controller 620 also includes a graphical user interface adjustment module 624 coupled to the user locator module 622 and to the display 102, for adjusting at least one of position, size, shape, color, brightness, or contrast of at least one of the plurality of graphical objects, not shown, displayed by the display 102. These parameters are adjusted in dependence upon the change of the distance D and/or the viewing angle θ detected by the user locator module 622, so as to lessen a resulting change of visible shape or size, and/or a change of visibility of the at least one graphical object to the user 108, as was explained above with reference to FIGS. 1A-1C to 5A-5C.

In a preferred embodiment shown in FIG. 6, the controller 620 includes an optional gesture recognition module 626 for recognizing gestures of the user 108, and an optional gesture sensitivity adjustment module 628 coupled to the user locator module 622 and to the gesture recognition module 626, for adjusting a sensitivity of the gesture recognition module 626 to the user's gestures in dependence on the change of the distance D and/or the viewing angle θ of the user 108 detected by the user locator module 622, so as to lessen a resulting change of the sensitivity of the gesture recognition module 626 to the user's gestures, as was explained above with reference to FIGS. 1A-1C to 5A-5C.

The controller 620 can also include a learning module 630 coupled to the user locator module 622, for learning and recording in a database (not shown) past changes of the distance D and/or the viewing angle θ of the user 108 relative to the display 102. The past motion vectors of the user 108 can be used to determine possible future changes of the distance D and/or the viewing angle θ of the user 108, by searching for repeating patterns in the past movements and comparing them to present movements of the user 108 detected by the user interface 600. This enables a predictive adjustment of the graphical object or a group of graphical objects visible on the display 102. A learning module 632 can be coupled to the gesture recognition module 626, to learn the gestures of the user 108, allowing prediction of the user's future gestures by analyzing a correlation of the current gestures with the repeating gesture patterns stored in a database (not shown).

The recognized gestures are interpreted as commands 634, which are then executed by an external execution module 636. For example, computer files can be copied, moved, or deleted by the execution module 636 in response to the "grabbing" and "moving" gestures of the user 108 sorting through the files.

The display 102 can include a two-dimensional display, a three-dimensional display, such as the display 502 of FIGS. 5A to 5C, a holographic display, a vapor screen display, etc. The spatial detector 106 can include a scanning laser ranging system such as a laser radar, in which a pulsed laser beam is raster-scanned, and a reflected optical signal is detected with temporal resolution of the order of tens of picoseconds; a time-of-flight camera equipped with a pulsed or modulated light source and a time-gated or a phase-sensitive detector array; a stereoscopic camera equipped with a suitable 3D data processor; or any other suitable 3D input device known to a person skilled in the art of 3D imagery.

The user interface 600 can be configured to perform the method steps described above with reference to FIGS. 1A-C to 5A-C. The user interface 600 can be configured to dynamically adjust the display parameters by performing the following steps:

(i) determining the distance D and/or the viewing angle θ of the user 108 relative to the user interface 600;

(ii) detecting a change of the distance D and/or the viewing angle θ determined in step (i); and (iii) dynamically adjusting at least one of position, size, shape, color, brightness, or contrast of at least one of a plurality of graphical objects displayed by the user interface 600, so as to lessen a change of shape and/or size of the at least one graphical object visible to the user 108 as a result of the change of the distance D and/or the viewing angle θ detected in step (ii).

Preferably, in step (iii), the adjustment of the size of the at least one graphical object is substantially proportional to the change of the distance D detected in step (ii). The color saturation, brightness, and/or the contrast of the at least one graphical object can also be made dependent on, and preferably substantially proportional to the change of the distance D determined in step (ii), to facilitate viewing of the graphical object at larger distances D.

Still referring to FIG. 6 with further reference to FIGS. 3A, 3B, 4A, and 4B, the user interface 600 can be configured to keep the angular size Δ of the objects (e.g. soft button triad 103) constant at varying viewing angle θ. By way of a further clarifying example, the shape of the button triad 103 can be characterized by a vertical height h and a horizontal width W with respect to gravity, the viewing angle θ being horizontal with respect to the gravity. In step (iii), the adjustment of the width W of the button triad 103 can be made substantially inversely proportional to cosine square of the viewing angle θ determined in step (i). In this way, the angular size Δ of the button triad 103 can be kept constant at the varying viewing angle θ. Of course, and other graphical object or objects can be used in place of the button triad 103. Other adjustment formulas could be used.

In the preferred embodiment of the user interface 600 of FIG. 6, the user interface 600 is capable of gesture recognition, by means of the gesture recognition module 626. In step (i), the distance D and/or the viewing angle θ of the user 108 relative to the display 102 can result in a change of the sensitivity of the gesture recognition. To compensate for or to lessen this sensitivity, the dynamic adjustment of the parameters of the user interface 600 should include a step of (iv) adjusting the gesture recognition sensitivity in dependence on the change of distance D and/or the viewing angle θ, detected in step (i).

The above-described embodiments of the present invention can be implemented in any of numerous ways. For example, the modules of the controller 620 may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Generally, a processor may be implemented using circuitry in any suitable format. It is to be understood that the modules 607, 622, 624, 626, 628, 630, and 632 of the controller 620 are shown separately for illustration only. These modules can be combined in software and/or hardware, such that one software/hardware module corresponds to, or includes a plurality of the modules shown in FIG. 6.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of operating a gesture recognition based user interface comprising a display for displaying a plurality of graphical objects, and a spatial detector for detecting a distance and/or a viewing angle of a user relative to the display, the method comprising:

(a) using the spatial detector to detect a change of the distance and/or the viewing angle of the user relative to the display, wherein the change of the distance and/or the viewing angle of the user relative to the display results in a change of a sensitivity of the gesture recognition;

(b) automatically adjusting at least one of position, orientation, size, shape, color, brightness, or contrast of at least one of the plurality of graphical objects displayed by the display, in dependence upon the change detected in step (a), so as to lessen a change of visible shape or size, and/or a change of visibility of the at least one graphical object to the user, resulting from the change detected in step (a);

(c) automatically adjusting the gesture recognition sensitivity in dependence on the change of the distance and/or the viewing angle of the user, detected in step (a), so as to lessen the change of the gesture recognition sensitivity due to the change of the distance and/or viewing angle of the user; and (d) repeating steps (a) through (c) by continuously adjusting the at least one of position, orientation, size, shape, color, brightness, or contrast of the at least one graphical object, so as to lessen changes of the visible shape or size, and/or changes of the visibility of the at least one graphical object, resulting from changes of the distance and/or the viewing angle of the user relative to the display; and by continuously adjusting the gesture recognition sensitivity, so as to lessen the change of the gesture recognition sensitivity due to the change of the distance and/or viewing angle of the user.

2. The method of claim 1, wherein in step (b), the adjustment of color includes adjustment of color saturation, wherein the adjustment of the at least one of position, orientation, size, color saturation, brightness, or contrast is substantially proportional to the change of the distance and/or the viewing angle of the user, detected in step (a).

3. The method of claim 1, wherein in step (c), the gesture recognition sensitivity adjustment is substantially proportional to the change of the distance and/or the viewing angle of the user, detected in step (a).

4. The method of claim 1, wherein in step (b), the adjustment of the at least one of position, orientation, size, shape, color, brightness, or contrast is performed predictively based on the user's past movements and/or gestures.

5. The method of claim 1, wherein in step (c), the adjustment of the sensitivity of the gesture recognition is performed predictively based on the user's past movements and/or gestures.

6. The method of claim 1, wherein the at least one graphical object comprises a cluster of neighboring graphical objects of the plurality of graphical objects.

7. The method of claim 6, wherein the at least one graphical object comprises each of the plurality of graphical objects.

8. The method of claim 1, wherein in step (b), the shape and size of the at least one graphical object are adjusted to keep angular size thereof substantially constant when the distance and the viewing angle of the user are within a range of interaction between the user and the user interface.

9. The method of claim 1, wherein the display comprises a three-dimensional display, wherein in step (b), the position and/or orientation of the at least one of the plurality of graphical objects is characterized by two lateral coordinates and a depth coordinate, wherein the depth coordinate of the at least one graphical object is adjusted so as to lessen a perceived distance variation between the user and the at least one graphical object, as the user moves within the range of interaction with the user interface.

10. The method of claim 9, wherein in step (b), at least one of the two lateral coordinates of the at least one graphical object is adjusted, so as to cause the at least one graphical object to follow a body of the user, as the user moves within the range of interaction with the user interface.

11. The method of claim 10, wherein steps (a) through (d) are performed for each of a plurality of users, each user corresponding to a particular one of the plurality of graphical objects, wherein in step (b), the position of each of the plurality of graphical objects is adjusted to follow a body of the respective user.

12. A method for dynamically adjusting a gesture recognition based graphical user interface for interaction with a user, the method comprising:
(i) determining a distance and/or a viewing angle of the user relative to the graphical user interface;
(ii) detecting a change of the distance and/or the viewing angle determined in step (i), wherein the change of the distance and/or the viewing angle of the user relative to the display results in a change of a sensitivity of the gesture recognition;
(iii) dynamically adjusting at least one of position, orientation, size, shape, color, brightness, or contrast of at least one of a plurality of graphical objects displayed by the graphical user interface, so as to lessen a change of shape and/or size of the at least one graphical object visible to the user, resulting from the change of the distance and/or the viewing angle thereof detected in step (ii); and
(iv) adjusting the gesture recognition sensitivity in dependence on the change of the distance and/or the viewing angle of the user, detected in step (i), so as to lessen the change of the gesture recognition sensitivity due to the change of the distance and/or viewing angle of the user detected in step (ii).

13. The method of claim 12, wherein in step (iii), a magnitude of the adjustment of the size of the at least one graphical object is substantially proportional to the change of the distance detected in step (ii).

14. The method of claim 13, wherein the shape of the at least one graphical object is characterized by a vertical height and a horizontal width with respect to gravity, wherein the viewing angle is horizontal with respect to the gravity, and
wherein in step (iii), the adjustment of the width of the at least one graphical object is substantially inversely proportional to cosine square of the viewing angle determined in step (i).

15. The method of claim 13, wherein the brightness and/or the contrast of the at least one graphical object are substantially proportional to the change of the distance determined in step (ii).

16. A user interface apparatus, comprising:
a display for displaying a plurality of graphical objects to a user;
a spatial detector for determining a distance and/or a viewing angle of the user relative to the display; and
a controller operationally coupled to the display and the spatial detector, the controller including:
a user locator module coupled to the spatial detector, for detecting a change of the distance and/or the viewing angle of the user relative to the display;
a graphical user interface adjustment module coupled to the user locator module and to the display, for automatically adjusting at least one of position, orientation, size, shape, color, brightness, or contrast of at least one of the plurality of graphical objects displayed by the display, in dependence upon the change of the distance and/or the viewing angle detected by the user locator module, so as to lessen a change of visible shape or size, and/or a change of visibility of the at least one graphical object to the user, resulting from the detected change of the distance and/or the viewing angle of the user;
a gesture recognition module for recognizing gestures of the user; and
a gesture sensitivity adjustment module coupled to the user locator module and to the gesture recognition module, for automatically adjusting a sensitivity of the gesture recognition module to the user's gestures in dependence on the change of the distance and/or the viewing angle of the user detected by the user locator module, so as to lessen a change of the sensitivity of the gesture recognition module to the user's gestures caused by the change of the distance and/or the viewing angle of the user.

17. The user interface apparatus of claim 16, wherein the controller further comprises a learning module coupled to the user locator module, for learning past changes of the distance and/or the viewing angle of the user relative to the display, to determine possible future changes of the distance and/or the viewing angle of the user, for performing a predictive adjustment of the at least one graphical object.

18. The user interface apparatus of claim 16, wherein the display comprises a three-dimensional display.

19. The user interface apparatus of claim 16, wherein the spatial detector comprises a time-of-flight camera.

* * * * *